US009600415B1

(12) United States Patent
Lee et al.

(10) Patent No.: US 9,600,415 B1
(45) Date of Patent: Mar. 21, 2017

(54) METHOD, APPARATUS, AND COMPUTER PROGRAM STORED IN COMPUTER READABLE MEDIUM FOR MANAGING STORAGE SERVER IN DATABASE SYSTEM

(71) Applicant: TmaxData Co., Ltd., Gyeonggi-do (KR)

(72) Inventors: Moon Hoen Lee, Gyeonggi-do (KR); Hun Young Park, Gyeonggi-do (KR)

( * ) Notice: Subject to any disclaimer, the term of this patent is extended or adjusted under 35 U.S.C. 154(b) by 0 days.

(21) Appl. No.: 15/089,166

(22) Filed: Apr. 1, 2016

(30) Foreign Application Priority Data

Feb. 26, 2016 (KR) .................... 10-2016-0023056

(51) Int. Cl.
*G06F 12/08* (2016.01)
*G06F 17/30* (2006.01)

(52) U.S. Cl.
CPC ...... *G06F 12/0804* (2013.01); *G06F 17/3048* (2013.01); *G06F 2212/45* (2013.01)

(58) Field of Classification Search
CPC ............ G06F 12/0804; G06F 17/3048; G06F 2212/45
See application file for complete search history.

(56) References Cited

U.S. PATENT DOCUMENTS

| 6,349,364 B1* | 2/2002 | Kai ................ G06F 12/0886 |
| | | 711/129 |
| 2008/0244185 A1 | 10/2008 | O'Krafka et al. | |
| 2010/0115205 A1* | 5/2010 | Brown ............... G06F 12/0868 |
| | | 711/135 |
| 2013/0053066 A1* | 2/2013 | Khorashadi ........... H04W 4/04 |
| | | 455/456.2 |
| 2013/0086330 A1 | 4/2013 | Baddepudi et al. | |

FOREIGN PATENT DOCUMENTS

KR    1020150025274    3/2015

OTHER PUBLICATIONS

TR Gopalakrishnan Nair, A Rank Based Replacement Policy for Multimedia Server Cache Using Zipf-Like Law, Mar. 2010, Jornal of Computing.*

* cited by examiner

*Primary Examiner* — Ryan Bertram
(74) *Attorney, Agent, or Firm* — Fish & Tsang LLP

(57) ABSTRACT

Disclosed is a method of managing a storage server in a database system. Provided is a storage server including a cache device to store at least one block that includes data; a permanent storage medium to record the at least one block stored in the cache device; and a controller to record the at least one block stored in the cache device in the permanent storage medium, wherein the controller includes a grade determiner to determine a grade of each of the at least one block based on a size of each of the at least one block; a victim block determiner to determine a victim block to be recorded in the permanent storage medium among blocks stored in the cache device based on the determined grade of each of the at least one block; and a block recorder to record the determined victim block in the permanent storage medium.

8 Claims, 5 Drawing Sheets

METHOD, APPARATUS, AND COMPUTER PROGRAM STORED IN COMPUTER READABLE MEDIUM FOR MANAGING STORAGE SERVER IN DATABASE SYSTEM

CROSS-REFERENCE TO RELATED APPLICATIONS

This application claims priority to and the benefit of Korean Patent Application No. 10-2016-0023056 filed in the Korean Intellectual Property Office on Feb. 26, 2016, the entire contents of which are incorporated herein by reference.

TECHNICAL FIELD

The present disclosure relates to a method of managing a storage server in a database system, and more particularly, a method of efficiently managing a cache device.

BACKGROUND ART

A database system may collect, store, manage, and analyze data. Recently, technology for a mass database management system, such as big data processing of extracting a large set of structured or unstructured data and a value from such data and analyzing a result, is in development.

In the case of performing a database operation, the database system operates in a cache device to decrease an input/output (I/O) time. For example, when a database server is to change data recorded in a storage server, the database server loads data from the storage server, stores the loaded data in the cache device, changes an object stored in the cache device, and applies the changed data to the storage server.

With a large capacity of a database ongoing, the storage server has become to include a large amount of data. Accordingly, technology for a method of managing a large amount of data in the storage server is required.

The above related art is disclosed in U.S. Pat. No. 7,111,005.

SUMMARY OF THE INVENTION

The present disclosure has been conceived to outperform the aforementioned related art and thus, has been made in an effort to provide a method of efficiently managing data in a database system.

An exemplary embodiment of the present disclosure provides a storage server including a cache device to store at least one block that includes data; a permanent storage medium to record the at least one block stored in the cache device; and a controller to record the at least one block stored in the cache device in the permanent storage medium, wherein the controller includes a grade determiner to determine a grade of each of the at least one block based on a size of each of the at least one block; a victim block determiner to determine a victim block to be recorded in the permanent storage medium among blocks stored in the cache device based on the determined grade of each of the at least one block; and a block recorder to record the determined victim block in the permanent storage medium.

Another exemplary embodiment of the present disclosure provides a database management program including instructions stored in a computer readable medium to control a computer to perform the following operations, wherein the operations include an operation of determining a grade of each of at least one block based on a size of each of the at least one block, each of the at least one block including data and the at least one block being stored in a cache device; an operation of determining a victim block to be recorded in a permanent storage medium among blocks stored in the cache device based on the determined grade of each of the at least one block; and an operation of recording the determined victim block in the permanent storage medium.

Still another exemplary embodiment of the present disclosure provides a database management method including determining a grade of each of at least one block based on a size of each of the at least one block, each of the at least one block including data and the at least one block being stored in a cache device; determining a victim block to be recorded in a permanent storage medium among blocks stored in the cache device based on the determined grade of each of the at least one block; and recording the determined victim block in the permanent storage medium.

According to exemplary embodiments of the present disclosure, there is provided a method of efficiently managing data in a data system.

BRIEF DESCRIPTION OF THE DRAWINGS

Various aspects are described with reference to the accompanying drawings in which like reference numerals refer to like constituent elements. In the following exemplary embodiments, a plurality of specific detail matters is provided to help the general understanding of one or more aspects for the purpose of the description. However, it will be clear that the aspect(s) may be implemented without the detail matters. In other examples, known structures and apparatuses are illustrated in a block diagram form to help the description of one or more aspects.

DETAILED DESCRIPTION

Figure 1:
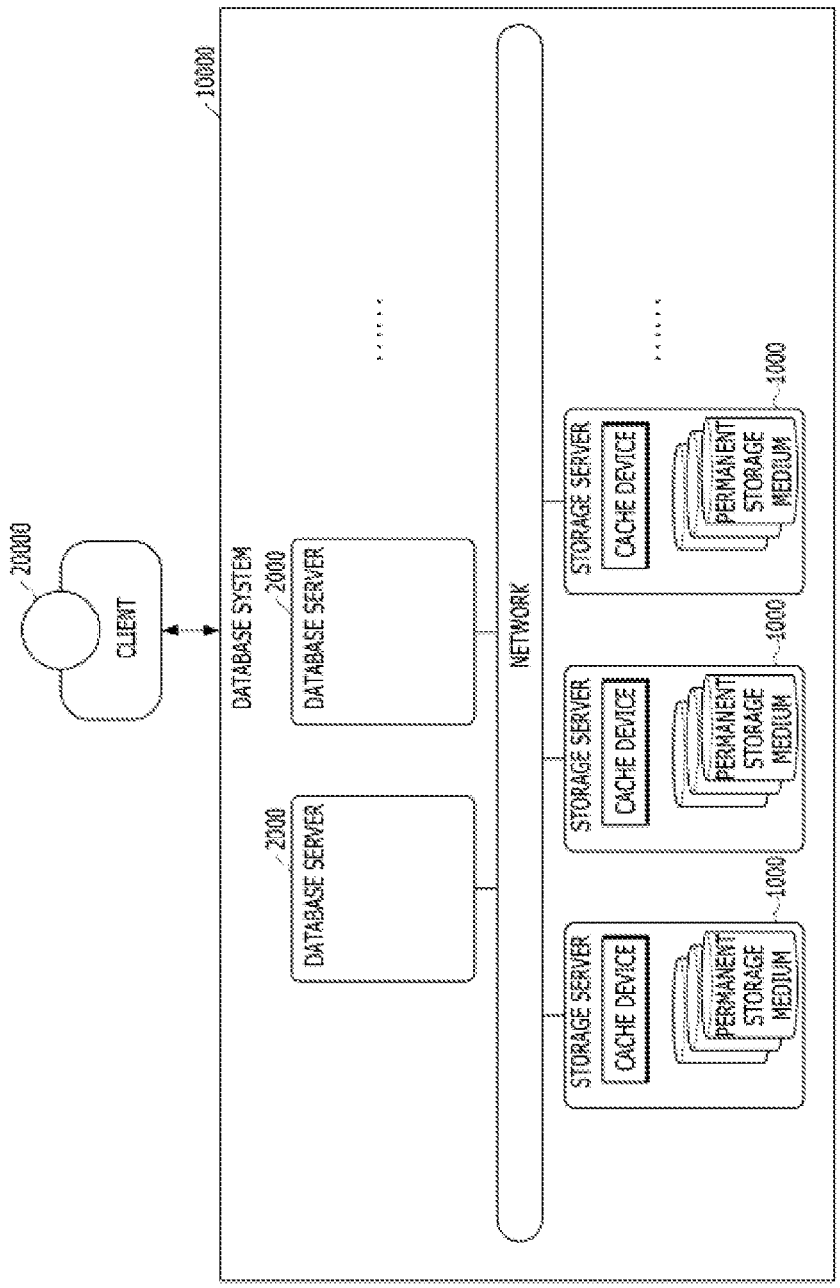
FIG. 1 is a block diagram illustrating an example of a database system according to an exemplary embodiment of the present disclosure.

Various exemplary embodiments are described with reference to the accompanying drawings in which like reference numerals refer to like constituent elements throughout. In the present specification, various descriptions are provided to help understand the present disclosure. However, it is apparent that the exemplary embodiments may be implemented without the detailed descriptions. In other examples, known structures and apparatuses are provided in a block diagram form to help the description of the exemplary embodiments.

The terms, "component", "module", "system", and the like, used in the present specification refer to a computer-related entity, hardware, firmware, software, a combination of software and hardware, or execution of software. For example, the component may be a processing process executed on a processor, the processor, an object, an execution thread, a program, and/or a computer, however, the present disclosure is not limited thereto. For example, any of an application executed on a computing device and the computing device may be the component. At least one component may be present in the processor and/or the execution thread at all times. A single component may be localized in a single computer or may be distributed between two or more computers. Also, the components may be executed from various computer readable media having various data structures stored therein. For example, the components may communicate through local and/or remote processes according to a signal (for example, data through a network, such as another system and the Internet, through data and/or a signal from a single component that interacts with another component in a local system and a distributed system) having one or more data packets.

In the present specification, a database indicates a system that stores related data in a form to be capable of being processed by a computer. The database may manage data and answer a question of a user, and data stored in the database may be changed. The database may store new data and may perform an operation of deleting and changing the existing data.

In the present specification, a transaction indicates a continuous processing unit about a series of operations, such as exchange of information, database update, and the like. The transaction may be defined as a basic unit of an operation for completing a requested operation in a state in which integrity of the database is guaranteed.

In the present specification, a block may indicate a chunk of data. For example, the block may include a single table in which data is stored and may include a plurality of tables. The block may have various sizes. For example, the block may have sizes of 10 kb, 100 kb, 1 megabyte, 2 megabytes, 3 megabytes, 4 megabytes, and the like, however, the present disclosure is not limited thereto.

In the present specification, flushing indicates an operation of determining a victim block among blocks stored in a cache device 1200 and recording the determined victim block in a permanent storage medium 1400.

In the present specification, a dirty block indicates a block in which data included in the permanent storage medium 1400 does not match data included in the cache device 1200. A clean block indicates a block in which data included in the permanent storage medium 1400 matches data included in the cache device 1200. A victim block indicates at least a portion of blocks selected for flushing from dirty blocks.

Description related to the proposed exemplary embodiments is provided for those skilled in the art to use or implement the present disclosure. It will be apparent to those skilled in the art that various modifications may be made to the exemplary embodiments. General principles defined herein may be applicable to other exemplary embodiments without departing from the scope of the present disclosure. Accordingly, the present disclosure is not limited thereto and should be interpreted within the widest scope consistent with the proposed principles and new features.

Hereinafter, exemplary embodiments of the present disclosure will be described in detail with reference to the accompanying drawings.

FIG. 1 is a block diagram illustrating an example of a database system according to an exemplary embodiment of the present disclosure.

A database system 10000 may include at least one database server 2000 and at least one storage server 1000.

The database server 2000 may include a predetermined type of a computer system or a computer device, such as a microprocessor, a main frame computer, a digital single processor, a portable device, a device controller, and the like.

A client 20000 may indicate nodes in a database system having a mechanism for communication through a network. For example, the client 20000 may include a personal computer (PC), a laptop computer, a workstation, a terminal, and/or a predetermined electronic device having network accessibility. Also, the client 20000 may include a predetermined server configured by at least one of an agent, an application programming interface (API), and a plug-in.

The database server 2000 may include a memory (not shown). The database server 2000 may perform a database operation using the memory. For example, when the database server 2000 performs a transaction, the database server 2000 may load data from the storage server 1000 and may store the loaded data in at least a portion of the memory (not shown).

The memory (not shown) may indicate a volatile storage device that s a primary storage device directly accessed by a processor, such as random access memory (RAM), such as dynamic RAM (DRAM), static RAM (SRAM), and the like, and in which stored information is momentarily erased if power is off, however, the present disclosure is not limited thereto. The memory may operate by the processor.

The database server 2000 may be connected to the storage server 1000 over a network. The network may include a wired network and a wireless network, however, the present disclosure is not limited thereto.

The storage server 1000 indicates a server capable of continuously storing data. The database server 2000 may include the cache device 1200 and the permanent storage medium 1400.

The cache device 1200 may include a semiconductor-based storage device capable of continuously storing data. For example, the cache device 1200 may include a solid state disk or a solid state drive (SSD), a flash memory, and the like, however, the present disclosure is not limited thereto.

The permanent storage medium 1400 may include a non-volatile storage medium capable of continuously storing data. For example, the permanent storage medium 1400 may include a storage device based on a flash memory and/or a battery-backup memory in addition to a disk, an optical disc, and a magneto-optical storage device, however, the present disclosure is not limited thereto.

The cache device 1200 may have relatively excellent write and read performance compared to that of the permanent storage medium 1400.

When a request for storing a block is received from the database server 2000, the storage server 1000 may store the block received from the database server 2000 in the cache device 1200 having the relatively excellent write and read performance. In this case, the database server 2000 may recognize that the block is stored.

To preserve the block stored in the cache device 1200, the storage server 1000 may record the block in the permanent storage medium 1400 before deleting the block stored in the cache device 1200 due to a limited space of the cache device 1200.

When recording the block in the permanent storage medium 1400, the storage server 1000 may determine a grade of each of the blocks based on a size of each of the blocks stored in the cache device 1200. Also, the storage server 1000 may determine a victim block to be recorded in the permanent storage medium 1400 among the blocks stored in the cache device 1200 by applying a different policy based on the determined grade, and may efficiently record the determined victim block in the permanent storage medium 1400.

The storage server 1000 may improve the usability of the cache device 1200 and the permanent storage medium 1400 by determining the grade of each of the blocks stored in the cache device 1200, by determining the victim block based on the different policy corresponding to the determined grade, and by efficiently recording the determined victim block in the permanent storage medium 1400.

Figure 2:
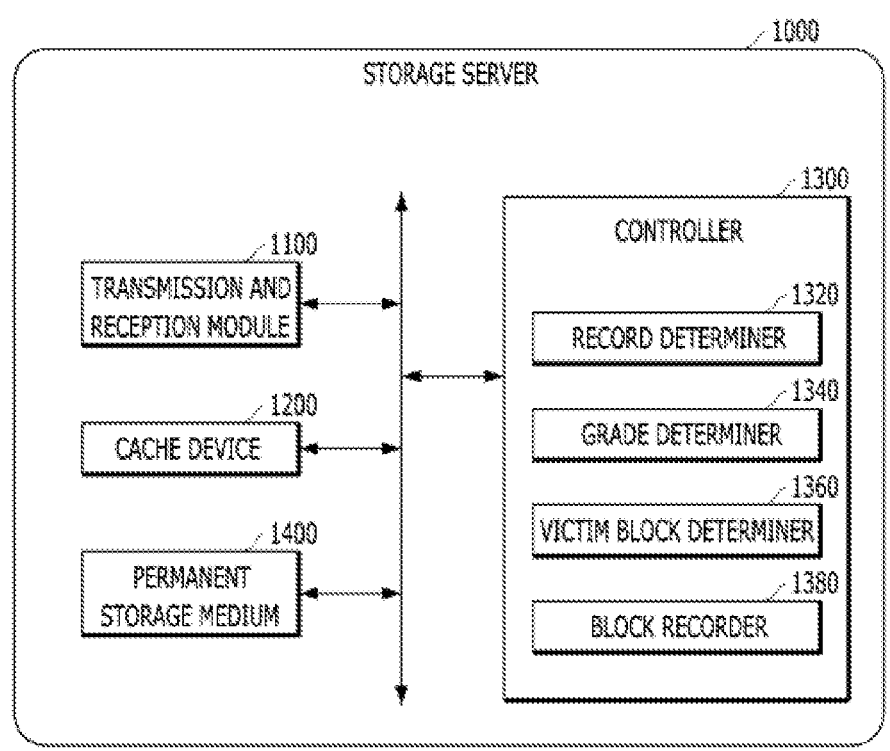
FIG. 2 is a block diagram illustrating an example of components of a storage server according to an exemplary embodiment of the present disclosure.

FIG. 2 is a block diagram illustrating an example of components of a storage server according to an exemplary embodiment of the present disclosure.

The storage server 1000 may include a transmission and reception module 1100, the cache device 1200, the permanent storage medium 1400, and a controller 1300.

The transmission and reception module 1100 may receive a block from the database server 2000. Also, the transmission and reception module 1100 may transmit a block read from the cache device 1200 or the permanent storage medium 1400 to the database server 2000.

The cache device 1200 may store the block received at the transmission and reception module 1100. For example, the storage server 1000 may store the block received from the database server 2000 in the cache device 1200.

The cache device 1200 may include a semiconductor-based storage device capable of continuously storing data. For example, the cache device 1200 may include an SSD, a flash memory, and the like, however, the present disclosure is not limited thereto.

The permanent storage medium 1400 may record the block stored in the cache device 1200. For example, the storage server 1000 may record the block stored in the cache device 1200 in the permanent storage medium 1400. Once the block is recorded in the permanent storage medium 1400, the storage server 1000 may store another block at a position at which the block of the cache device 1200 is stored.

For example, once a first block is recorded in the permanent storage medium 1400, the storage server 1000 may store another block at a position at which the first block of the cache device 1200 is stored.

The permanent storage medium 1400 indicates a non-volatile storage medium capable of continuously storing data. For example, the permanent storage medium 1400 may include a storage device based on a flash memory and/or a battery-backup memory in addition to a disk, an optical disc, and a magneto-optical storage device.

The controller 1300 may include a record determiner 1320, a grade determiner 1340, a victim block determiner 1360, and a block recorder 1380. The record determiner 1320, the grade determiner 1340, the victim block determiner 1360, and the block recorder 1380 may be configured by a single processor. Each thereof may be configured by a single processor, however, the present disclosure is not limited thereto.

The controller 1300 may manage data stored in the cache device 1200 based on a block unit. For example, the controller 1300 may manage a single set of table data as a single block and may manage a plurality of sets of table data as a single block, however, the present disclosure is not limited thereto.

The record determiner 1320 may determine whether to record at least one block stored in the cache device 1200 in the permanent storage medium 1400. The record determiner 1320 may determine whether to record at least one block stored in the cache device 1200 in the permanent storage medium 1400 based on at least one of an input of a user, a usage amount of the permanent storage medium 1400, a usage amount of the cache device 1200, the number of dirty blocks, and the number of clean blocks.

For example, when the usage amount of the permanent storage medium 1400 is less than a threshold value, the record determiner 1320 may determine to record at least one block stored in the cache device 1200 in the permanent storage medium 1400.

When the usage amount of the cache device 1200 is greater than or equal to a threshold value, the record determiner 1320 may determine to record at least one block stored in the cache device 1200 in the permanent storage medium 1400.

The record determiner 1320 may determine at least one block stored in the cache device 1200 in the permanent storage medium 1400 based on the input of the user.

When the number of clean blocks is less than a threshold value, the record determiner 1320 may determine to record at least one block stored in the cache device 1200 in the permanent storage medium 1400.

When the number of dirty blocks is greater than or equal to a threshold value, the record determiner 1320 may determine to record at least one block stored in the cache device 1200 in the permanent storage medium 1400.

The record determiner 1320 may determine to record at least one block stored in the cache device 1200 in the permanent storage medium 1400 based on a combination of the aforementioned examples.

The grade determiner 1340 may determine a grade of each of the blocks stored in the cache device 1200 based on a size of a block.

The grade determiner 1340 may predetermine a grade decision standard. For example, the grade determiner 1340 may predetermine the grade decision standard based on the input of the user, and may predetermine the grade decision standard based on information received from an external device, however, the present disclosure is not limited thereto.

The grade determiner 1340 may automatically determine the grade decision standard without the input of the user or information received from the external device. For example, the grade determiner 1340 may automatically determine the grade decision standard based on performance when the block is recorded in the permanent storage medium 1400. For example, in a case in which a performance difference occurs based on a predetermined size when the block is recorded in the permanent storage medium 1400, the grade determiner 1340 may determine a value indicating the predetermined size as the grade decision standard.

The grade determiner 1340 may determine the grade of the block based on the determined grade decision standard and the size of the block. For example, the grade determiner 1340 may determine a grade of a block having a size greater than the grade decision standard as a large grade and may determine a grade of a block having a size less than the grade decision standard as a small grade.

The grade determiner 1340 may determine the grade of the block as a small grade, a middle grade, or a large grade, based on two threshold values. Without being limited thereto, the grade determiner 1340 may determine the grade of the block using various grades.

According to another exemplary embodiment of the present disclosure, the grade determiner 1340 may define a new block by combining a plurality of small grade blocks. Also, when a size of the new block is greater than the grade decision standard, the grade determiner 1340 may determine the new block as the large grade.

The victim block determiner 1360 may determine a victim block to be recorded in the permanent storage medium 1400 among blocks stored in the cache device 1200 based on the determined grade of each of the blocks.

The victim block determiner 1360 may determine the victim block by applying a different policy based on the determined grade.

With respect to blocks determined as the large grade, the victim block determiner 1360 may determine the victim block based on order in which the blocks are used. For example, with respect to the blocks determined as the large grade, the victim block determiner 1360 may determine, as the victim block, a block having a longest use history.

In this case, the victim block determiner 1360 may determine the number of victim blocks based on at least one of the usage amount of the cache device 1200, the usage amount of the permanent storage medium 1400, the number of dirty blocks, and the number of clean blocks.

When the usage amount of the cache device 1200 is relatively great, when the usage amount of the permanent storage medium 1400 is relatively small, when the number of clean blocks is relatively small, when the number of dirty blocks is relatively large, or when the combination thereof occurs, the victim block determiner 1360 may increase the number of victim blocks, thereby efficiently managing the cache device 1200.

With respect to blocks determined as the small grade, the victim block determiner 1360 may determine the victim block based on positions at which the blocks determined as the small grade are to be recorded within the permanent storage medium 1400.

For example, the victim block determiner 1360 may group blocks determined as the small grade into at least one group based on physical recording positions within the permanent storage medium 1400. For example, the victim block determiner 1360 may determine, as a single group, blocks of which recording positions within the permanent storage medium 1400 are separate at a distance within a threshold value. Also, the victim block determiner 1360 may determine, as a single group, blocks to be recorded in a specific area of the permanent storage medium 1400.

The victim block determiner 1360 may determine, as victim blocks, blocks included in at least one group among the determined groups.

In this case, the block recorder 1380 may record blocks included in the same group in the same time interval. For example, when blocks included in a first group are determined as victim blocks, the storage server 1000 may record the blocks included in the first group in the permanent storage medium 1400 in the same time interval.

The storage server 1000 may improve the performance of a recording operation of the storage server 1000 by recording blocks having adjacent recording positions within the permanent storage medium 1400 in the same time interval.

According to another exemplary embodiment of the present disclosure, the victim block determiner 1360 may determine the victim block based on at least one of the usage amount of the permanent storage medium 1400 and the usage amount of the cache device 1200, and the determined grade of the block.

For example, when the usage amount of the permanent storage medium 1400 is less than a threshold value, the victim block determiner 1360 may increase a ratio of the large grade among victim blocks. Also, when the usage amount of the cache device 1200 is greater than or equal to a threshold value, the victim block determiner 1360 may increase a ratio of the large grade among the victim blocks. Also, when the usage amount of the permanent storage medium 1400 is less than a threshold value and the usage amount of the cache device 1200 is greater than or equal to the threshold value, the victim block determiner 1360 may increase a ratio of the large grade among the victim blocks.

The victim block determiner 1360 may quickly record a block in the permanent storage medium 1400 and may quickly secure a room of the cache device 1200 by increasing a ratio of the large grade among the victim blocks.

The block recorder 1380 may record the determined victim block in the permanent storage medium 1400.

The block recorder 1380 may record the determined victim blocks among the blocks stored in the cache device 1200 in the permanent storage medium 1400.

In this case, the block recorder 1380 may record blocks included in the same group among small grade blocks in the same time interval. For example, when blocks included in the first group among the small grade blocks are determined as victim blocks, the block recorder 1380 may record the blocks included in the first group in the permanent storage medium 1400 in the same time interval.

The storage server 1000 may determine, as clean blocks, blocks recorded in the permanent storage medium 1400 among blocks stored in the cache device 1200. Also, the storage server 1000 may store another block received from the database server 2000 at a position of a block determined as the clean block among the blocks included in the cache device 1200.

According to another exemplary embodiment of the present disclosure, the record determiner 1320, the grade determiner 1340, the victim block determiner 1360, and the block recorder 1380 of the storage server 1000 may be positioned outside the storage server 1000. For example, the record determiner 1320, the grade determiner 1340, the victim block determiner 1360, and the block recorder 1380 of the storage server 1000 may be positioned in the database server 2000 and may be positioned outside the database system 10000, however, the present disclosure is not limited thereto.

Figure 3:
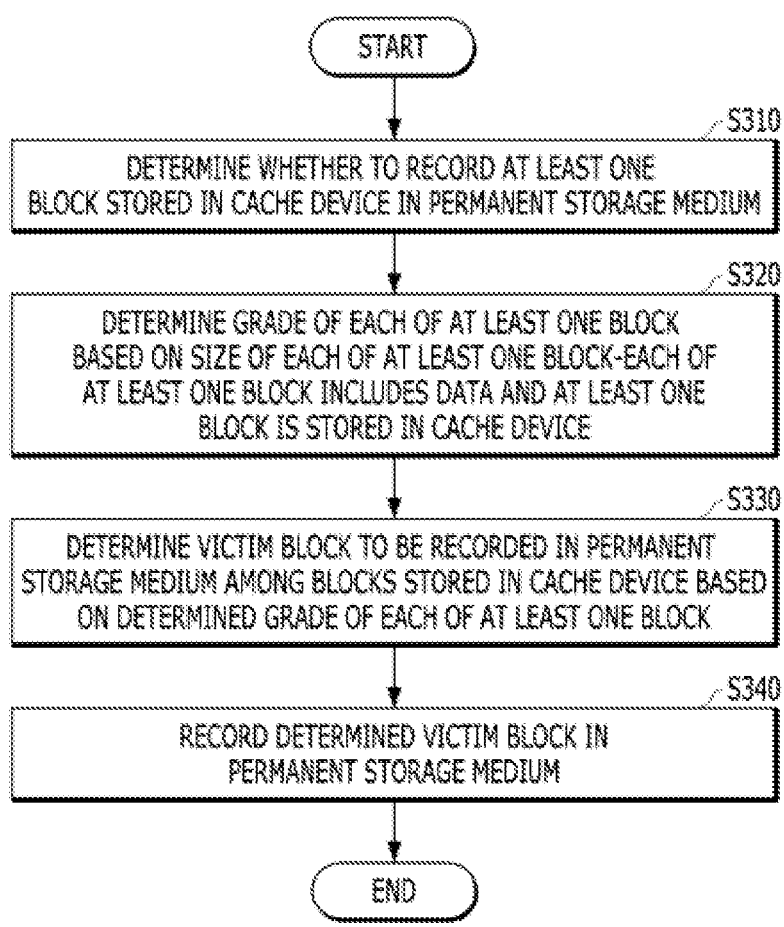
FIG. 3 is a flowchart illustrating a flushing method at a storage server according to an exemplary embodiment of the present disclosure.

FIG. 3 is a flowchart illustrating a flushing method by the storage server 1000 according to an exemplary embodiment of the present disclosure.

In operation S310, the storage server 1000 may determine whether to record at least one block stored in the cache device 1200 in the permanent storage medium 1400.

The storage server 1000 may determine whether to record at least one block stored in the cache device 1200 in the permanent storage medium 1400 based on at least one of an input of a user, a usage amount of the permanent storage medium 1400, a usage amount of the cache device 1200, the number of dirty blocks, and the number of clean blocks.

For example, when the usage amount of the permanent storage medium 1400 is less than a threshold value, the storage server 1000 may determine to record at least one block stored in the cache device 1200 in the permanent storage medium 1400.

When the usage amount of the cache device 1200 is greater than or equal to a threshold value, the storage server 1000 may determine to record at least one block stored in the cache device 1200 in the permanent storage medium 1400.

The storage server 1000 may determine at least one block stored in the cache device 1200 in the permanent storage medium 1400 based on the input of the user.

When the number of clean blocks is less than a threshold value, the storage server 1000 may determine to record at least one block stored in the cache device 1200 in the permanent storage medium 1400.

When the number of dirty blocks is greater than or equal to a threshold value, the storage server 1000 may determine to record at least one block stored in the cache device 1200 in the permanent storage medium 1400.

The storage server 1000 may determine to record at least one block stored in the cache device 1200 in the permanent storage medium 1400 based on a combination of the aforementioned examples.

In operation S320, the storage server 1000 may determine a grade of each of the blocks stored in the cache device 1200 based on a size of a block.

The storage server 1000 may predetermine a grade decision standard. For example, the storage server 1000 may predetermine the grade decision standard based on the input of the user, and may predetermine the grade decision standard based on information received from an external device, however, the present disclosure is not limited thereto.

The storage server 1000 may automatically determine the grade decision standard without the input of the user or information received from the external device. For example, the storage server 1000 may automatically determine the grade decision standard based on performance when the block is recorded in the permanent storage medium 1400. For example, in a case in which a performance difference occurs based on a predetermined size when the block is recorded in the permanent storage medium 1400, the storage server 1000 may determine a value indicating the predetermined size as the grade decision standard.

The storage server 1000 may determine the grade of the block based on the determined grade decision standard and the size of the block. For example, the storage server 1000 may determine a grade of a block having a size greater than the grade decision standard as a large grade and may determine a grade of a block having a size less than the grade decision standard as a small grade.

The storage server 1000 may determine the grade of the block as a small grade, a middle grade, or a large grade, based on two threshold values. Without being limited thereto, the storage server 1000 may determine the grade of the block using various grades.

According to another exemplary embodiment of the present disclosure, the storage server 1000 may define a new block by combining a plurality of small grade blocks. Also, when a size of the new block is greater than the grade decision standard, the storage server 1000 may determine the new block as the large grade.

In operation S330, the storage server 1000 may determine a victim block to be recorded in the permanent storage medium 1400 among blocks stored in the cache device 1200 based on the determined grade of each of the blocks.

The storage server 1000 may determine the victim block by applying a different policy based on the determined grade.

With respect to blocks determined as the large grade, the storage server 1000 may determine the victim block based on order in which the blocks are used. For example, with respect to the blocks determined as the large grade, the storage server 1000 may determine, as the victim block, a block having a longest use history.

In this case, the storage server 1000 may determine the number of victim blocks based on at least one of the usage amount of the cache device 1200, the usage amount of the permanent storage medium 1400, the number of dirty blocks, and the number of clean blocks.

When the usage amount of the cache device 1200 is relatively great, when the usage amount of the permanent storage medium 1400 is relatively small, when the number of dirty blocks is relatively large, when the number of clean blocks is relatively small, or when the combination thereof occurs, the storage server 1000 may increase the number of victim blocks, thereby efficiently managing the cache device 1200.

With respect to blocks determined as the small grade, the storage server 1000 may determine the victim block based on positions at which the blocks determined as the small grade are to be recorded within the permanent storage medium 1400.

For example, the storage server 1000 may group blocks determined as the small grade into at least one group based on physical recording positions within the permanent storage medium 1400. For example, the storage server 1000 may determine, as a single group, blocks of which recording positions within the permanent storage medium 1400 are separate at a distance within a threshold value. Also, the storage server 1000 may determine, as a single group, blocks to be recorded in a specific area of the permanent storage medium 1400.

The storage server 1000 may determine, as victim blocks, blocks included in at least one group among the determined groups.

In this case, the storage server 1000 may record blocks included in the same group in the same time interval. For example, when blocks included in a first group are determined as victim blocks, the storage server 1000 may record the blocks included in the first group in the permanent storage medium 1400 in the same time interval.

The storage server 1000 may improve the performance of a recording operation of the storage server 1000 by recording blocks having adjacent recording positions within the permanent storage medium 1400 in the same time interval.

According to another exemplary embodiment of the present disclosure, the storage server 1000 may determine the victim block based on at least one of the usage amount of the permanent storage medium 1400 and the usage amount of the cache device 1200, and the determined grade of the block.

For example, when the usage amount of the permanent storage medium 1400 is less than a threshold value, the storage server 1000 may increase a ratio of the large grade among victim blocks. Also, when the usage amount of the cache device 1200 is greater than or equal to a threshold value, the storage server 1000 may increase a ratio of the large grade among the victim blocks. Also, when the usage amount of the permanent storage medium 1400 is less than a threshold value and the usage amount of the cache device 1200 is greater than or equal to the threshold value, the storage server 1000 may increase a ratio of the large grade among the victim blocks.

The storage server 1000 may quickly record a block in the permanent storage medium 1400 and may quickly secure a room of the cache device 1200 by increasing a ratio of the large grade among the victim blocks.

In operation S340, the storage server 1000 may record the determined victim block in the permanent storage medium 1400.

The storage server 1000 may record the determined victim blocks among the blocks stored in the cache device 1200 in the permanent storage medium 1400.

In this case, the storage server 1000 may record blocks included in the same group among small grade blocks in the same time interval. For example, when blocks included in the first group among the small grade blocks are determined as victim blocks, the storage server 1000 may record the blocks included in the first group in the permanent storage medium 1400 in the same time interval.

The storage server 1000 may determine, as clean blocks, blocks recorded in the permanent storage medium 1400 among blocks stored in the cache device 1200. Also, the storage server 1000 may store another block received from the database server 2000 at a position of a block determined as the clean block among the blocks included in the cache device 1200.

According to another exemplary embodiment of the present disclosure, the aforementioned exemplary embodiments may be performed by the database server 2000.

In operation S310, the database server 2000 may determine whether to record at least one block stored in the cache device 1200 in the permanent storage medium 1400.

The database server 2000 may determine whether to record at least one block stored in the cache device 1200 in the permanent storage medium 1400 based on at least one of an input of a user, a usage amount of the permanent storage medium 1400, a usage amount of the cache device 1200, the number of dirty blocks, and the number of clean blocks.

For example, when the usage amount of the permanent storage medium 1400 is less than a threshold value, the database server 2000 may determine to record at least one block stored in the cache device 1200 in the permanent storage medium 1400.

When the usage amount of the cache device 1200 is greater than or equal to a threshold value, the database server 2000 may determine to record at least one block stored in the cache device 1200 in the permanent storage medium 1400.

The database server 2000 may determine at least one block stored in the cache device 1200 in the permanent storage medium 1400 based on the input of the user.

When the number of clean blocks is less than a threshold value, the database server 2000 may determine to record at least one block stored in the cache device 1200 in the permanent storage medium 1400.

When the number of dirty blocks is greater than or equal to a threshold value, the database server 2000 may determine to record at least one block stored in the cache device 1200 in the permanent storage medium 1400.

The database server 2000 may determine to record at least one block stored in the cache device 1200 in the permanent storage medium 1400 based on a combination of the aforementioned examples.

In operation S320, the database server 2000 may determine a grade of each of the blocks stored in the cache device 1200 based on a size of a block.

The database server 2000 may predetermine a grade decision standard. For example, the database server 2000 may predetermine the grade decision standard based on the input of the user, and may predetermine the grade decision standard based on information received from an external device, however, the present disclosure is not limited thereto.

The database server 2000 may automatically determine the grade decision standard without the input of the user or information received from the external device. For example, the database server 2000 may automatically determine the grade decision standard based on performance when the block is recorded in the permanent storage medium 1400. For example, in a case in which a performance difference occurs based on a predetermined size when the block is recorded in the permanent storage medium 1400, the database server 2000 may determine a value indicating the predetermined size as the grade decision standard.

The database server 2000 may determine the grade of the block based on the determined grade decision standard and the size of the block. For example, the database server 2000 may determine a grade of a block having a size greater than the grade decision standard as a large grade and may determine a grade of a block having a size less than the grade decision standard as a small grade.

The database server 2000 may determine the grade of the block as a small grade, a middle grade, or a large grade, based on two threshold values. Without being limited thereto, the database server 2000 may determine the grade of the block using various grades.

According to another exemplary embodiment of the present disclosure, the database server 2000 may define a new block by combining a plurality of small grade blocks. Also, when a size of the new block is greater than the grade decision standard, the database server 2000 may determine the new block as the large grade.

In operation S330, the database server 2000 may determine a victim block to be recorded in the permanent storage medium 1400 among blocks stored in the cache device 1200 based on the determined grade of each of the blocks.

The database server 2000 may determine the victim block by applying a different policy based on the determined grade.

With respect to blocks determined as the large grade, the database server 2000 may determine the victim block based on order in which the blocks are used. For example, with respect to the blocks determined as the large grade, the database server 2000 may determine, as the victim block, a block having a longest use history.

In this case, the database server 2000 may determine the number of victim blocks based on at least one of the usage amount of the cache device 1200, the usage amount of the permanent storage medium 1400, the number of dirty blocks, and the number of clean blocks.

When the usage amount of the cache device 1200 is relatively great, when the usage amount of the permanent storage medium 1400 is relatively small, when the number of dirty blocks is relatively large, when the number of clean blocks is relatively small, or when the combination thereof occurs, the database server 2000 may increase the number of victim blocks, thereby efficiently managing the cache device 1200.

With respect to blocks determined as the small grade, the database server 2000 may determine the victim block based on positions at which the blocks determined as the small grade are to be recorded within the permanent storage medium 1400.

For example, the database server 2000 may group blocks determined as the small grade into at least one group based on physical recording positions within the permanent storage medium 1400. For example, the database server 2000 may determine, as a single group, blocks of which recording positions within the permanent storage medium 1400 are separate at a distance within a threshold value. Also, the database server 2000 may determine, as a single group, blocks to be recorded in a specific area of the permanent storage medium 1400.

The database server 2000 may determine, as victim blocks, blocks included in at least one group among the determined groups.

In this case, the database server 2000 may record blocks included in the same group in the same time interval. For example, when blocks included in a first group are determined as victim blocks, the database server 2000 may record the blocks included in the first group in the permanent storage medium 1400 in the same time interval.

The database server 2000 may improve the performance of a recording operation of the storage server 1000 by recording blocks having adjacent recording positions within the permanent storage medium 1400 in the same time interval.

According to another exemplary embodiment of the present disclosure, the database server 2000 may determine the victim block based on at least one of the usage amount of the permanent storage medium 1400 and the usage amount of the cache device 1200, and the determined grade of the block.

For example, when the usage amount of the permanent storage medium 1400 is less than a threshold value, the database server 2000 may increase a ratio of the large grade among victim blocks. Also, when the usage amount of the cache device 1200 is greater than or equal to a threshold value, the database server 2000 may increase a ratio of the large grade among the victim blocks. Also, when the usage amount of the permanent storage medium 1400 is less than a threshold value and the usage amount of the cache device 1200 is greater than or equal to the threshold value, the database server 2000 may increase a ratio of the large grade among the victim blocks.

The database server 2000 may quickly record a block in the permanent storage medium 1400 and may quickly secure a room of the cache device 1200 by increasing a ratio of the large grade among the victim blocks.

In operation S340, the database server 2000 may record the determined victim block in the permanent storage medium 1400.

The database server 2000 may record the determined victim blocks among the blocks stored in the cache device 1200 in the permanent storage medium 1400.

In this case, the database server 2000 may record blocks included in the same group among small grade blocks in the same time interval. For example, when blocks included in the first group among the small grade blocks are determined as victim blocks, the database server 2000 may record the blocks included in the first group in the permanent storage medium 1400 in the same time interval.

The database server 2000 may determine, as clean blocks, blocks recorded in the permanent storage medium 1400 among blocks stored in the cache device 1200. Also, the database server 2000 may store another block at a position of a block determined as the clean block among the blocks included in the cache device 1200.

Figure 4:
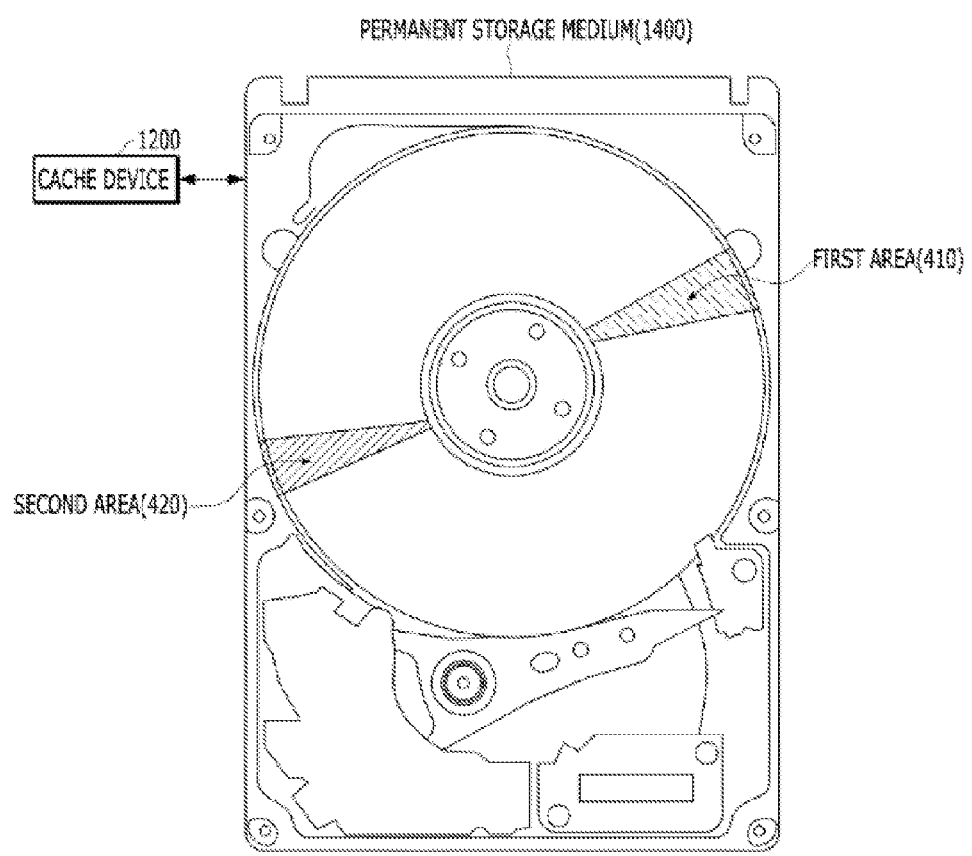
FIG. 4 is a diagram to describe a method of recording, by a storage server, a small grade block in a permanent storage medium according to an exemplary embodiment of the present disclosure.

FIG. 4 is a diagram to describe a method of recording, by the storage server 1000, a small grade block in the permanent storage medium 1400 according to an exemplary embodiment of the present disclosure.

With respect to blocks determined as the small grade, the storage server 1000 may determine a victim block based on recording positions of the blocks determined as the small grade within the permanent storage medium 1400.

For example, the storage server 1000 may classify blocks determined as the small grade into at least one group based on a physical recording position within the permanent storage medium 1400. For example, the storage server 1000 may determine, as a first group, blocks to be recorded in a first area 410 within the permanent storage medium 1400 among blocks included in the cache device 1200. Also, the storage server 1000 may determine, as a second group, blocks to be recorded in a second area 420 within the permanent storage medium 1400 among blocks included in the cache device 1200.

The storage server 1000 may determine, as victim blocks, blocks included in at least one group among determined groups. For example, the storage server 1000 may determine blocks to be included in the first group as victim blocks.

The storage server 1000 may record blocks included in the same group in the same time interval. For example, when the blocks included in the first group are determined as the victim blocks, the storage server 1000 may record the blocks included in the first group in the first area 410 of the permanent storage medium 1400 in the same time interval.

The storage server 1000 may record blocks having adjacent recording positions within the permanent storage medium 1400 in the same time interval, thereby improving the performance of a recording operation of the storage server 1000.

Figure 5:
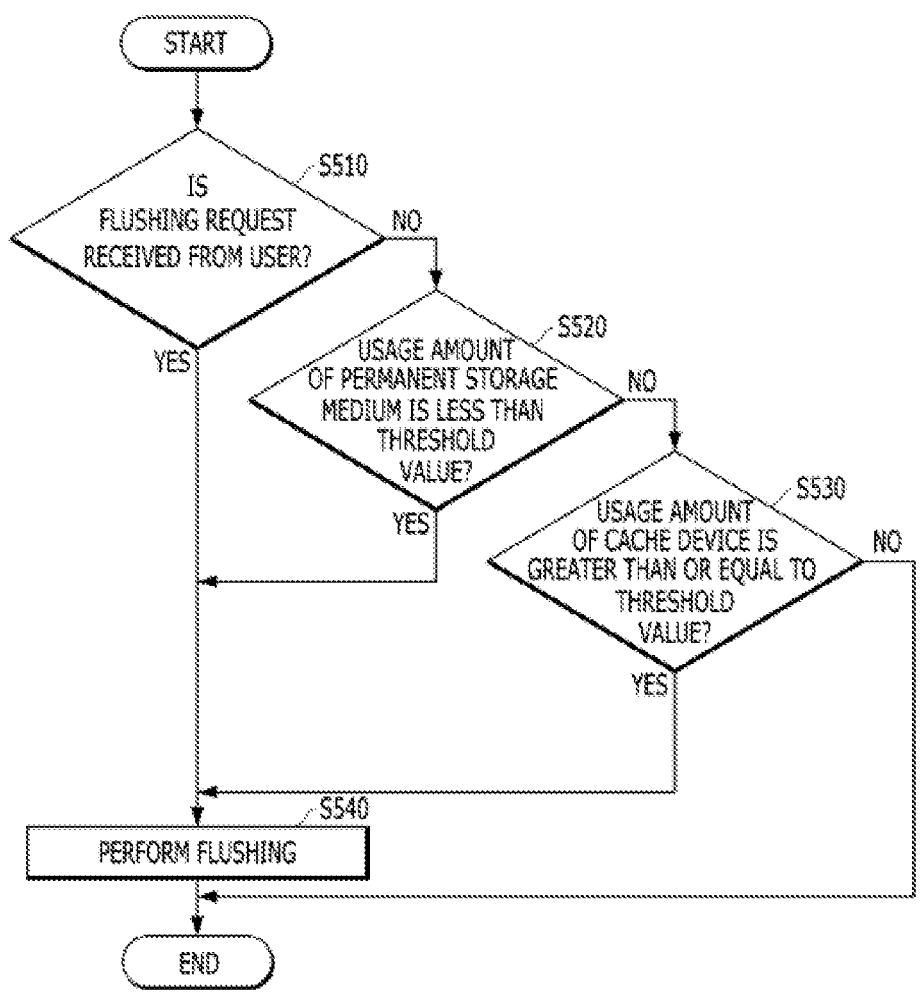
FIG. 5 is a flowchart illustrating a method of determining, by a storage server, whether to record at least one block stored in a cache device in a permanent storage medium according to an exemplary embodiment of the present disclosure.

FIG. 5 is a flowchart illustrating a method of determining, by the storage server 1000, whether to record at least one block stored in the cache device 1200 in the permanent storage medium 1400 according to an exemplary embodiment of the present disclosure.

The storage server 1000 may determine whether to perform flushing based on at least one of an input of a user, a usage amount of the permanent storage medium 1400, a usage amount of the cache device 1200, the number of dirty blocks, and the number of clean blocks. In this case, flushing indicates an operation of recording at least one block stored in the cache device 1200 in the permanent storage medium 1400.

In operation S510, the storage server 1000 may determine whether a flushing request is received from the user. When the flushing request is received from the user, the storage server 1000 may perform flushing in operation S540. When the flushing request is not received from the user, the storage server 1000 may perform operation S520. Flushing indicates an operation of determining a victim block among blocks stored in the cache device 1200 and recording the determined victim block in the permanent storage medium 1400.

In operation S520, the storage server 1000 may determine whether a value indicating the usage amount of the permanent storage medium 1400 is less than a threshold value. In this case, the storage server 1000 may determine the threshold value based on information received from the user, may determine the threshold value based on information received from an external device, and, without being limited thereto, may determine the threshold value using various methods.

When a value indicating the usage amount of the permanent storage medium 1400 is less than the threshold value, the storage server 1000 may perform flushing in operation S540. Also, when the value indicating the usage amount of the permanent storage medium 1400 is greater than or equal to the threshold value, the storage server 1000 may perform operation S530.

In operation S530, the storage server 1000 may determine whether a value indicating the usage amount of the cache device 1200 is greater than or equal to a threshold value. In this case, the storage server 1000 may determine the threshold value based on information received from the user, may determine the threshold value based on information received from the external device, and, without being limited thereto, may determine the threshold value using various methods.

When the value indicating the usage amount of the cache device 1200 is greater than or equal to the threshold value, the storage server 1000 may perform flushing in operation S540. Also, when the value indicating the usage amount of the cache device 1200 is less than the threshold value, the storage server 1000 may not perform flushing.

In operation S540, the storage server 1000 may perform flushing. The flushing method is described above with FIGS. 2 and 3.

The exemplary embodiments of the present disclosure may be configured in a form of a recording medium including instructions executable by a computer, such as a program module executed by the computer. Computer readable media may be available media accessible by the computer, and include all of volatile and non-volatile media and separable and inseparable media. Also, the computer readable media may include temporary recordable media and non-temporary recordable media.

The computer readable media may include all of computer storage media and communication media. The computer storage media include all of volatile and non-volatile media and separable and inseparable media configured with a computer readable instruction, a data structure, a program module, or a method or technology for storing information such as other data. The communication media typically include a computer readable instruction, a data structure, a program module, or other data of a modulated data signal such as a carrier, or other transmission mechanisms, and include information transfer media.

The aforementioned description of the present disclosure is provided as an example and it will be apparent to those skilled in the art that various modifications and changes may be made without departing from the scope and spirit of the present disclosure. Therefore, it should be understood that the above embodiments are not limitative but illustrative in all aspects. For example, each constituent element described in a singular form may be distributed and thereby implemented. Similarly, constituent elements described to be distributive may be implemented in a combined form.

The scope of the present disclosure is defined by the appended claims rather than by the description preceding them, and therefore all changes and modifications that fall within metes and bounds of the claims, or equivalents of such metes and bounds are therefore intended to be embraced by the claims.

What is claimed is:

1. A storage server comprising:
    a cache device to store at least one block that includes data;
    a permanent storage medium to record the at least one block stored in the cache device; and
    a controller to record the at least one block stored in the cache device in the permanent storage medium,
    wherein the controller comprises:
        a grade determiner to determine a grade of each of the at least one block based on a size of each of the at least one block, wherein the grade determiner determines a grade of a block as large grade when a size of the block is greater than or equal to a grade decision standard, and determines the grade of the block as small grade when the size of the block is less than the grade decision standard;
        a victim block determiner to determine a victim block to be recorded in the permanent storage medium among blocks stored in the cache device based on the determined grade of each of the at least one block and a position recorded in the permanent storage medium with respect to blocks determined as the small grade, wherein the victim block determiner determines the victim block by applying a different policy based on the determined grade; and
        a block recorder to record the determined victim block in the permanent storage medium.

2. The storage server of claim 1, wherein the controller further comprises:
    a record determiner to determine whether to record the at least one block stored in the cache device in the permanent storage medium, the record determiner determining whether to record the at least one block stored in the cache device in the permanent storage medium based on at least one of an input of a user, a usage amount of the permanent storage medium, a usage amount of the cache device, the number of dirty blocks, and the number of clean blocks,
    wherein a clean block indicates a block in which data included in the permanent storage medium matches data included in the cache device, and
    wherein a dirty block indicates a block in which data included in the permanent storage medium does not match data included in the cache device.

3. The storage server of claim 1, wherein the victim block determiner determines the victim block based on a used order with respect to blocks determined as large grade.

4. The storage server of claim 1, wherein the block recorder records blocks having adjacent recording positions within the permanent storage medium in the same time interval.

5. The storage server of claim 1, wherein the grade determiner defines a new block by combining a plurality of small grade blocks and determines the new block as large grade.

6. The storage server of claim 1, wherein the victim block determiner determines the victim block based on at least one of a usage amount of the permanent storage medium, a usage amount of the cache device, and the determined grade.

7. A database management program comprising instructions stored in a non-transitory computer readable medium to control a computer to perform the following operations, wherein the operations comprise:
    an operation of determining a grade of each of at least one block based on a size of each of the at least one block, each of the at least one block including data and the at least one block being stored in a cache device, wherein the operation of determining the grade of each of the at least one block comprises determining the grade of a block as large grade when a size of the block is greater than or equal to a grade decision standard, and determines the grade a block as small grade when the size of the block is less than the grade decision standard;
    an operation of determining a victim block to be recorded in a permanent storage medium among blocks stored in the cache device based on the determined grade of each of the at least one block and a position recorded in the permanent storage medium with respect to blocks determined as the small grade, wherein the operation of determining the victim block comprises determining the victim block by applying a different policy based on the determined grade; and
    an operation of recording the determined victim block in the permanent storage medium.

8. A database management method comprising:
    determining, by at least one processor, a grade of each of at least one block based on a size of each of the at least one block, each of the at least one block including data and the at least one block being stored in a cache device, wherein determining the grade of each of the at least one block comprises determining a grade of a block as large grade when a size of the block is greater than or equal to a grade decision standard, and determines the grade of the block as small grade when the size of the block is less than the grade decision standard;

determining, by the at least one processor, a victim block to be recorded in a permanent storage medium among blocks stored in the cache device based on the determined grade of each of the at least one block and a position recorded in the permanent storage medium with respect to blocks determined as the small grade, wherein determining the victim block comprises determining the victim block by applying a different policy based on the determined grade; and recording, by the at least one processor, the determined victim block in the permanent storage medium.

* * * * *